United States Patent
Lin et al.

(10) Patent No.: US 11,962,945 B2
(45) Date of Patent: Apr. 16, 2024

(54) PROJECTION APPARATUS

(71) Applicant: Himax Display, Inc., Tainan (TW)

(72) Inventors: Chi-Wen Lin, Tainan (TW); Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 349 days.

(21) Appl. No.: 17/334,808

(22) Filed: May 31, 2021

(65) Prior Publication Data
US 2022/0385865 A1    Dec. 1, 2022

(51) Int. Cl.
| | | |
|---|---|---|
| H04N 9/31 | (2006.01) | |
| G02B 27/48 | (2006.01) | |
| G03B 21/00 | (2006.01) | |
| G03H 1/32 | (2006.01) | |
| G03H 1/22 | (2006.01) | |

(52) U.S. Cl.
CPC ........... *H04N 9/3102* (2013.01); *G02B 27/48* (2013.01); *G03B 21/006* (2013.01); *G03H 1/32* (2013.01); *H04N 9/312* (2013.01); *G03H 2001/2297* (2013.01)

(58) Field of Classification Search
CPC .... H04N 9/3102; H04N 9/312; H04N 9/3111; H04N 9/3161; H04N 9/3182; H04N 9/3155; H04N 9/3179; G02B 27/48; G02B 27/283; G02B 27/4227; G02B 30/56; G03B 21/006; G03B 21/10; G03B 21/2006; G03B 21/2066; G03H 1/32; G03H 2001/2297; G03H 1/2294
See application file for complete search history.

(56) References Cited

U.S. PATENT DOCUMENTS

| | | | | |
|---|---|---|---|---|
| 9,848,176 | B2* | 12/2017 | Damberg | H04N 9/312 |
| 10,602,100 | B2* | 3/2020 | Damberg | H04N 9/3138 |
| 10,992,929 | B2* | 4/2021 | Tseng | H04N 17/002 |
| 11,328,634 | B1* | 5/2022 | Wu | G03H 1/0808 |
| 11,558,588 | B2* | 1/2023 | Damberg | H04N 9/3138 |
| 2007/0195288 | A1 | 8/2007 | Ahn | |
| 2017/0099466 | A1* | 4/2017 | Damberg | H04N 9/3105 |

FOREIGN PATENT DOCUMENTS

| | | |
|---|---|---|
| CN | 101923186 | 12/2010 |
| CN | 101963744 | 2/2011 |
| JP | 2004310103 | 12/2023 |

OTHER PUBLICATIONS

"Office Action of China Counterpart Application", dated Sep. 21, 2023, p. 1-p. 13.

\* cited by examiner

*Primary Examiner* — Vijay Shankar
(74) *Attorney, Agent, or Firm* — JCIPRNET

(57) ABSTRACT

A projection apparatus including a liquid crystal on silicon panel and a processor is provided. The liquid crystal on silicon panel is configured to display a plurality of phase images. The phase images include a first phase image and a second phase image. The processor is coupled to the liquid crystal on silicon panel. The processor is configured to generate and output the phase images to drive the liquid crystal on silicon panel to display the phase images. The processor generates the first phase image according to a first phase information, and the processor generates the second phase image according to the first phase image.

9 Claims, 6 Drawing Sheets

FIG. 4

PROJECTION APPARATUS

BACKGROUND

Technical Field

The invention generally relates to a projection apparatus. More particularly, the invention relates to a projection apparatus including a liquid crystal on silicon (LCoS) panel.

Description of Related Art

LCoS is a miniaturized reflective active-matrix liquid-crystal display or microdisplay using a liquid crystal layer on top of a silicon backplane. LCoS was initially developed for projection televisions but is now used for wavelength selective switching, structured illumination, near-eye displays and optical pulse shaping. For the holographic display using LCoS, it use light diffraction to form image. The formation of diffraction image is the reconstruction of constructive and destructive interference. When a laser beam incidents on LCoS, the diffraction image is reconstructed at a certain distance. Speckles result from these patterns of constructive and destructive interference and presents bright and dark dots in the target image to be displayed. The speckle contrast may become too high, and the reconstructed image is not uniform.

SUMMARY

The invention is directed to a projection apparatus, in which speckle contrast is reduced, and the reconstructed image is uniform.

An embodiment of the invention provides a projection apparatus including a liquid crystal on silicon panel and a processor. The liquid crystal on silicon panel is configured to display a plurality of phase images. The phase images include a first phase image and a second phase image. The processor is coupled to the liquid crystal on silicon panel. The processor is configured to generate and output the phase images to drive the liquid crystal on silicon panel to display the phase images. The processor generates the first phase image according to a first phase information, and the processor generates the second phase image according to the first phase image.

In an embodiment of the invention, the processor inverts an intensity distribution of the first phase image to generate the second phase image. The intensity distribution of the second phase image is inverted from the intensity distribution of the first phase image.

In an embodiment of the invention, the first phase image includes a plurality of first speckles, and the second phase image includes a plurality of second speckles. Speckle locations of the first speckles in the first phase image are the same as speckle locations of the second speckles in the second phase image.

In an embodiment of the invention, the first speckle is selected from one of a bright speckle and a dark speckle, and the second speckle is selected from the other of the bright speckle and the dark speckle.

In an embodiment of the invention, the processor generates a second phase information according to the first phase information, and the processor generates the second phase image according to the second phase information.

In an embodiment of the invention, the first phase information includes a first phase distribution of pixels of the liquid crystal on silicon panel, and the second phase information includes a second phase distribution of the pixels of the liquid crystal on silicon panel. The processor rearranges the first phase distribution of the pixels to generate the second phase distribution of the pixels.

In an embodiment of the invention, the pixels of the liquid crystal on silicon panel are grouped into a plurality of blocks, and each of the blocks includes plural pixels. The processor rearranges the first phase distribution in a block-based manner.

In an embodiment of the invention, the projection apparatus further includes a light source. The light source is configured to output an illumination beam. The liquid crystal on silicon panel converts the illumination beam into an image beam and output the image beam. The image beam comprises the phase images.

In an embodiment of the invention, the phase images are temporally projected onto an object to form a reconstructed image.

In an embodiment of the invention, an intensity of the illumination beam is adjusted for each of the phase images, and the intensity of the illumination beam corresponding to the first phase image is different from the intensity of the illumination beam corresponding to the second phase image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 illustrates a schematic diagram of different phase information according to an embodiment of the invention.

DESCRIPTION OF THE EMBODIMENTS

Embodiments are provided below to describe the disclosure in detail, though the disclosure is not limited to the provided embodiments, and the provided embodiments can be suitably combined.

Figure 1:
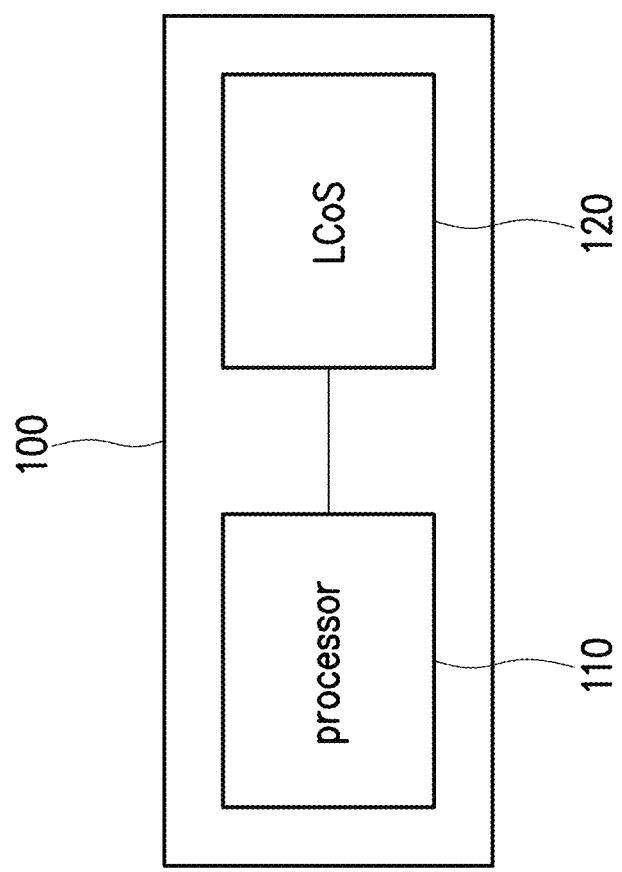
FIG. 1 illustrates a block diagram of a projection apparatus according to an embodiment of the invention.
Figure 2:
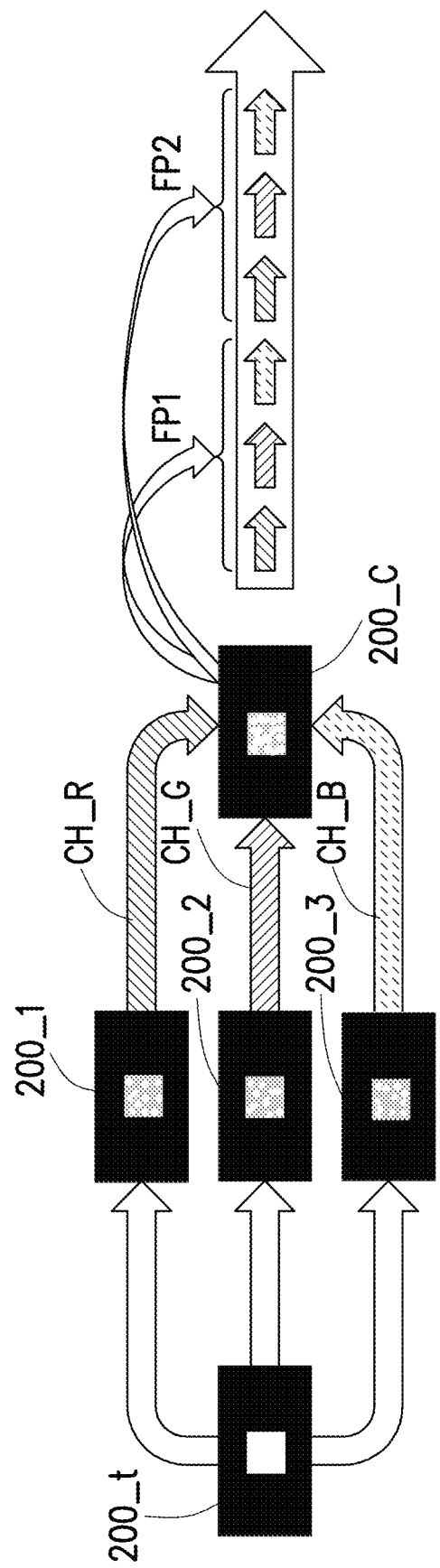
FIG. 2 illustrates a schematic diagram of a plurality of phase images according to an embodiment of the invention.

FIG. 1 illustrates a block diagram of a projection apparatus according to an embodiment of the invention. FIG. 2 illustrates a schematic diagram of a plurality of phase images according to an embodiment of the invention. The projection apparatus 100 of the present embodiment includes a processor 110 and a liquid crystal on silicon (LCoS) panel 120. The processor 110 is coupled to the LCoS 120. The LCoS 120 is configured to display a plurality of phase images 200_1, 200_2 and 200_3. The processor 110 is configured to generate and output the phase images 200_1, 200_2 and 200_3 to drive the LCoS 120 to display the phase images 200_1, 200_2 and 200_3.

To be specific, the image 200_t of FIG. 2 is a target image to be displayed. The processor 110 generates more than one phase images according an initial phase. The LCoS 120 serves as a phase modulator to temporally display the phase images 200_1, 200_2 and 200_3 with different phases during a frame period, e.g. a first frame period FP1 or a second frame period FP2. The phase images 200_1, 200_2 and 200_3 are respectively processed in different color channels CH_R, CH_G, CH_B. Liquid crystal phase of the LCoS 120 can be controlled by the processor 110. When an illumination beam incidents on the LCoS 120, the phase images 200_1, 200_2 and 200_3 are reconstructed as a reconstructed image 200_c at a certain distance.

In the present embodiment, to reduce speckle contrast, the LCoS 120 temporally displays the phase images 200_1, 200_2 and 200_3 with different phases. Thus, the randomly presented bright speckles 300 are uniformed as phase images are increased in one frame period. In an embodiment, six phase images can be combined for video to reduce speckle contrast. The location of speckles 300 are different in the phase images 200_1, 200_2 and 200_3 since different phases are used. The reconstructed image 200_c becomes more uniform as adding more phase images in one frame period.

In an embodiment, the processor 110 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the processor 110 can be obtained with reference to common knowledge in the related art.

Figure 3:
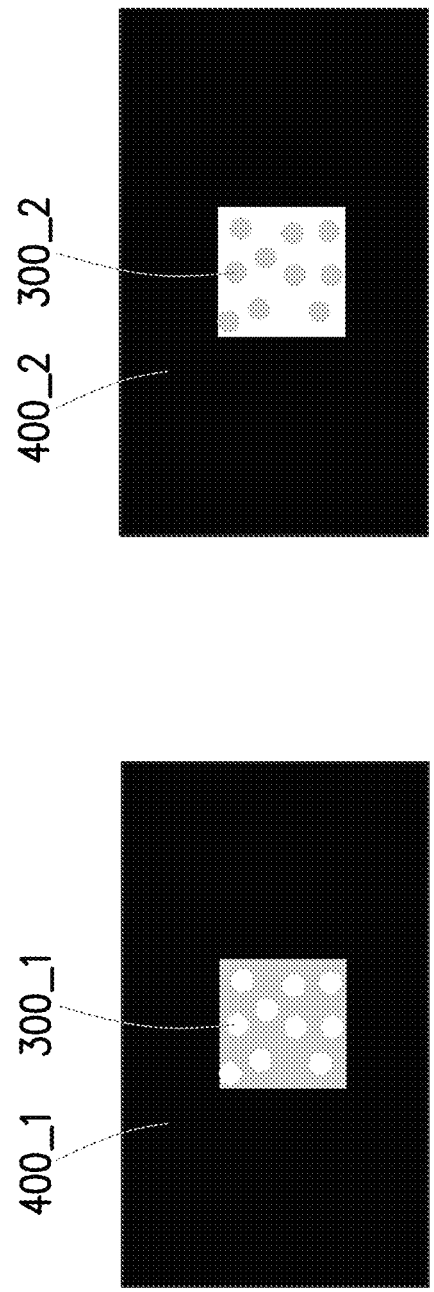
FIG. 3 illustrates a schematic diagram of different phase images according to an embodiment of the invention.

In addition to use random phase to generate phase images, the processor 110 can generates phase images in which speckle brightness compensate to each other. FIG. 3 illustrates a schematic diagram of different phase images according to an embodiment of the invention. Referring to FIG. 3, the phase images include a first phase image and a second phase image, and two different phase images 400_1 and 400_2 are shown in FIG. 3. The processor 110 generates the first phase image 400_1 according to an initial phase information 500_1 (a first phase information) as illustrated in FIG. 4, and the processor 110 further generates the second phase image 400_2 according to the first phase image 400_1.

The first phase image 400_1 includes a plurality of first speckles 300_1, and the second phase image 400_2 includes a plurality of second speckles 300_2. The speckle locations of the first speckles 300_1 in the first phase image 400_1 are the same as speckle locations of the second speckles 300_2 in the second phase image 400_2. The processor 110 inverts an intensity distribution of the first phase image 400_1 to generate the second phase image 400_2, and thus the intensity distribution of the second phase image 400_2 is inverted from the intensity distribution of the first phase image 400_1. The speckle brightness of the first phase image 400_1 and the second phase image 400_2 compensate to each other.

In the present embodiment, the first speckle 300_1 is a bright speckle, and the second speckle 300_2 is a dark speckle, but the invention is not limited thereto. In an embodiment, the first speckle 300_1 may be a dark speckle, and the second speckle 300_2 may be a bright speckle. In the present embodiment, the processor 110 inverts an intensity distribution of the first phase image 400_1 to generate the second phase image 400_2, and thus the speckle brightness of the first phase image 400_1 and the second phase image 400_2 compensate to each other to reduce speckle contrast.

Figure 4:
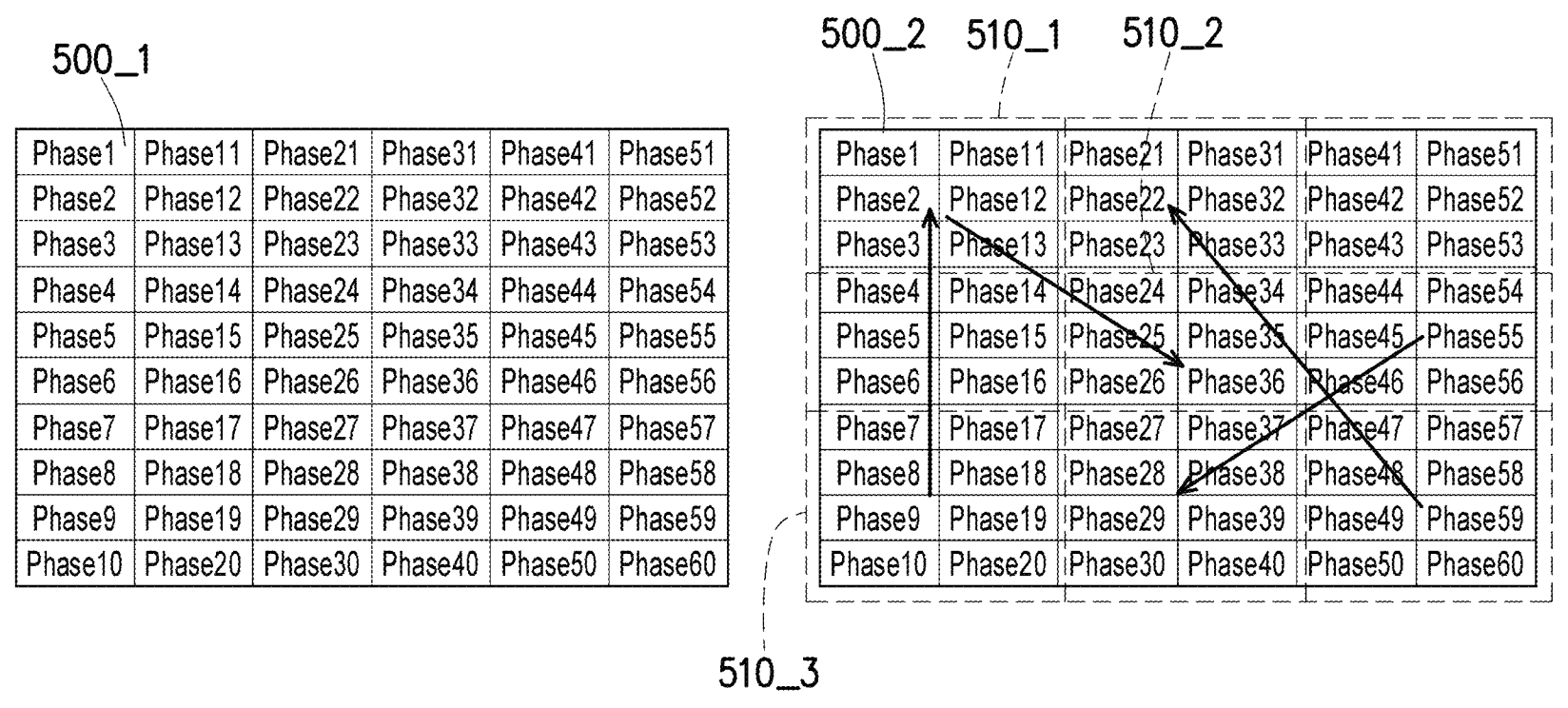

FIG. 4 illustrates a schematic diagram of different phase information according to an embodiment of the invention. Referring to FIG. 4, the first phase information 500_1 includes a first phase distribution of pixels of the LCoS 120, and the second phase information 500_2 includes a second phase distribution of the pixels of the LCoS 120. The processor 110 rearranges the first phase distribution of the pixels to generate the second phase distribution of the pixels. That is to say, the second phase information 500_2 is generated according to the first phase information 500_1. The first phase information 500_1 serves as an initial phase information, and the processor 110 generates the first phase image 200_1 according to the first phase information 500_1.

In the present embodiment, the pixels of the LCoS 120 are grouped into a plurality of blocks, and each of the blocks includes plural pixels. The processor 110 rearranges the first phase distribution to generate the second phase distribution in a block-based manner. For example, the block 510_1 is rearranged to the location of the block 510_2, and the block 510_3 is rearranged to the location of the block 510_1. Therefore, the processor 110 generates the second phase information 500_2 according to the first phase information 500_1, and the processor 110 further generates the second phase image 200_2 according to the second phase information 500_2.

Figure 5:
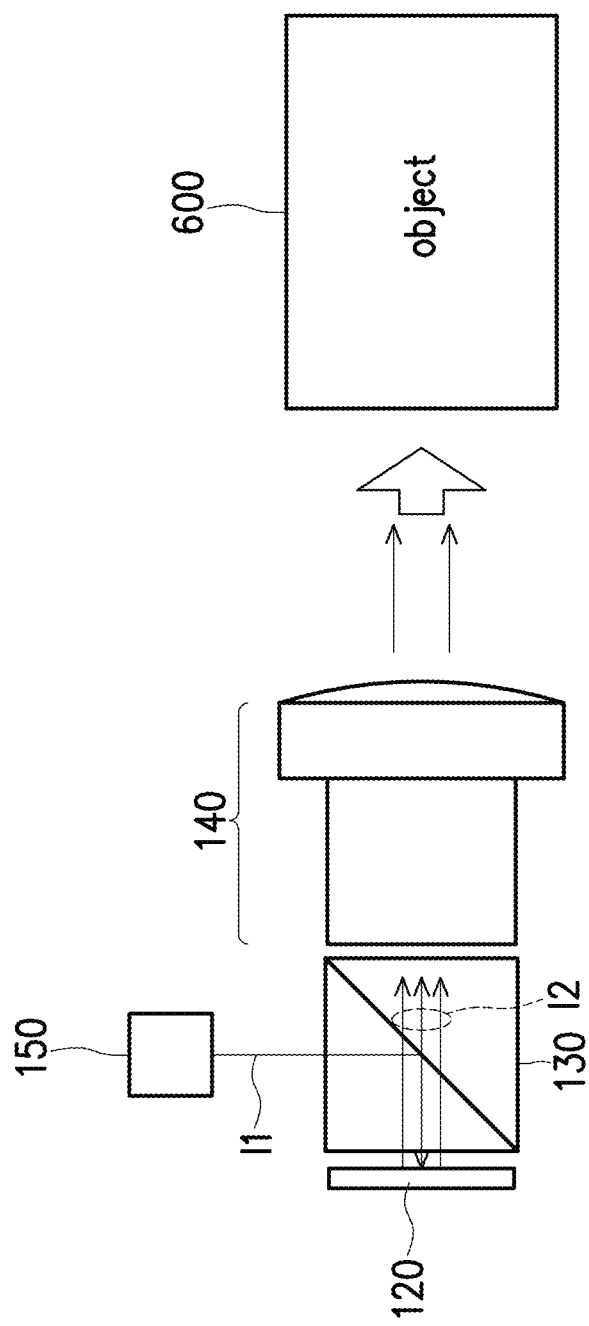
FIG. 5 illustrates a schematic diagram of a projection apparatus according to an embodiment of the invention.

FIG. 5 illustrates a schematic diagram of a projection apparatus according to an embodiment of the invention. Referring to FIG. 2 and FIG. 5, the projection apparatus 100 of the present embodiment further includes a light source 150, the LCoS panel 120, a beam splitter device 130 and a projection lens device 140. The projection apparatus 100 projects an image beam I2 to an object 600 to form a target image. The phase images 200_1, 200_2 and 200_3 are temporally projected onto the object to form the reconstructed image 200_c. The object 600 may be a screen or human eyes, but the invention is not limited thereto.

To be specific, the light source 110 is configured to output an illumination beam I1 to the beam splitter device 130. The beam splitter device 130 is configured to receive the illumination beam I1 and reflect the illumination beam I1 having a first polarization to the LCoS panel 120. The LCoS panel 120 is configured to convert the illumination beam I1 into an image beam I2 and outputs the image beam I2 to the beam splitter device 130. The image beam I2 includes information of the phase images.

The beam splitter device 130 transmits the image beam I2 having a second polarization to the projection lens device 140. In other words, the beam splitter device 130 can controls light polarization of the image beam I2 and outputs the polarized image beam I2 to the projection lens device 140. In the present embodiment, the beam splitter device 130 may be a polarizing beamsplitters (PBS) for reflecting the first polarization and transmitting the second polarization. For example, the beam splitter device 130 reflects beams with the S-polarization and transmits beams with the P-polarization, but the invention is not limited thereto. The projection lens device 140 is configured to output the polarized image beam I2 to form the projection image 200. In an embodiment, the projection lens device 140 may include a collimator and/or one or more lens groups to process and transmit the image beam I2.

Figure 6:
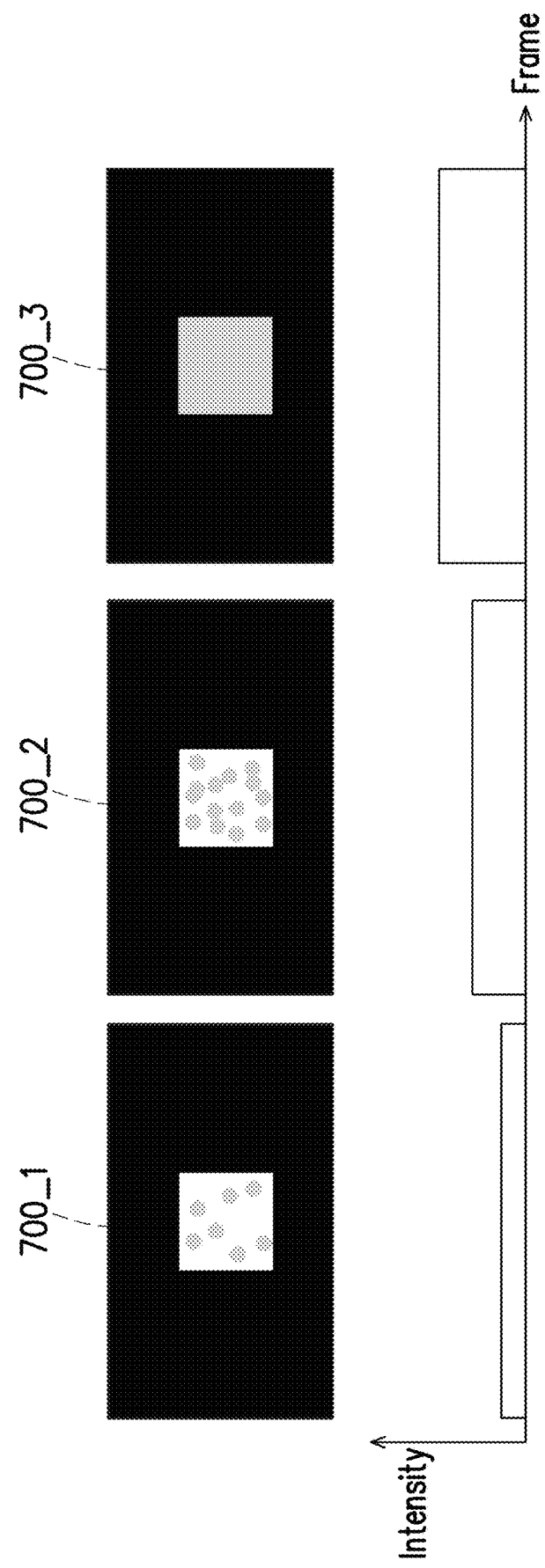
FIG. 6 illustrates a schematic diagram of an intensity of an illumination beam according to an embodiment of the invention.

FIG. 6 illustrates a schematic diagram of an intensity of an illumination beam according to an embodiment of the invention. Referring to FIG. 5 and FIG. 6, an intensity of the illumination beam I1 is adjusted for each of the phase images 200_1, 200_2 and 200_3. For example, the intensity of the illumination beam I1 corresponding to the first phase image 200_1 is different from the intensity of the illumination beam I1 corresponding to the second phase image 200_2. The intensity of the illumination beam I1 can be automatically adjusted according to the speckle size in each phase image.

In summary, in the embodiments of the invention, the intensity of the first phase image is inversed to generate the second phase image, and thus, the bright and dark speckle locations of the first phase image and the second phase image compensate to each other to reduce speckle contrast. In addition, the first phase distribution of the pixels is rearranged to generate the second phase distribution of the pixels, and the second phase image is generated according to the second phase information including the second phase distribution. Therefore, speckle contrast is reduced, and the reconstructed image becomes more uniform as adding more phase images in one frame period.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A projection apparatus, comprising:
   a liquid crystal on silicon panel, configured to display a plurality of phase images, wherein the phase images include a first phase image and a second phase image; and
   a processor, coupled to the liquid crystal on silicon panel and configured to generate and output the phase images to drive the liquid crystal on silicon panel to display the phase images,
   wherein the processor generates the first phase image according to a first phase information, and the processor generates the second phase image according to the first phase image,
   wherein the processor inverts an intensity distribution of the first phase image to generate the second phase image, and the intensity distribution of the second phase image is inverted from the intensity distribution of the first phase image.

2. The projection apparatus of claim 1, wherein the first phase image includes a plurality of first speckles, the second phase image includes a plurality of second speckles, and speckle locations of the first speckles in the first phase image are the same as speckle locations of the second speckles in the second phase image.

3. The projection apparatus of claim 2, wherein the first speckle is selected from one of a bright speckle and a dark speckle, and the second speckle is selected from the other of the bright speckle and the dark speckle.

4. The projection apparatus of claim 1, wherein the processor generates a second phase information according to the first phase information, and the processor generates the second phase image according to the second phase information.

5. The projection apparatus of claim 4, wherein
   the first phase information includes a first phase distribution of pixels of the liquid crystal on silicon panel, and the second phase information includes a second phase distribution of the pixels of the liquid crystal on silicon panel, and
   the processor rearranges the first phase distribution of the pixels to generate the second phase distribution of the pixels.

6. The projection apparatus of claim 5, wherein the pixels of the liquid crystal on silicon panel are grouped into a plurality of blocks, and each of the blocks includes plural pixels, and the processor rearranges the first phase distribution in a block-based manner.

7. The projection apparatus of claim 1, further comprising:
   a light source, configured to output an illumination beam, wherein the liquid crystal on silicon panel converts the illumination beam into an image beam and output the image beam, wherein the image beam comprises the phase images.

8. The projection apparatus of claim 7, wherein the phase images are temporally projected onto an object to form a reconstructed image.

9. The projection apparatus of claim 7, wherein an intensity of the illumination beam is adjusted for each of the phase images, and the intensity of the illumination beam corresponding to the first phase image is different from the intensity of the illumination beam corresponding to the second phase image.

* * * * *